US011240544B1

(12) United States Patent
Vaidberg et al.

(10) Patent No.: US 11,240,544 B1
(45) Date of Patent: Feb. 1, 2022

(54) SYSTEM, DEVICE, AND METHOD OF DIFFERENTIATING BETWEEN STREAMING LIVE-VIDEO FLOWS AND STREAMING NON-LIVE-VIDEO FLOWS

(71) Applicant: Allot Ltd., Hod HaSharon (IL)

(72) Inventors: Aviya Vaidberg, Kfar Saba (IL); Boris Lifshitz, Kokhav Yair (IL); Elad Moadim, Modi'in—Maccabim—Re'ut (IL)

(73) Assignee: ALLOT LTD., Hod Hasharon (IL)

( * ) Notice: Subject to any disclaimer, the term of this patent is extended or adjusted under 35 U.S.C. 154(b) by 0 days.

(21) Appl. No.: 17/246,649

(22) Filed: May 2, 2021

(51) Int. Cl.
*H04N 21/24* (2011.01)
*H04N 21/61* (2011.01)
*H04N 21/2187* (2011.01)

(52) U.S. Cl.
CPC ..... *H04N 21/2407* (2013.01); *H04N 21/2187* (2013.01); *H04N 21/6125* (2013.01)

(58) Field of Classification Search
CPC ........... H04N 21/2407; H04N 21/2187; H04N 21/6125
USPC ............................................................ 725/14
See application file for complete search history.

(56) References Cited

U.S. PATENT DOCUMENTS

2013/0276048 A1* 10/2013 Krasic ............ H04N 21/234309 725/116
2019/0253744 A1* 8/2019 Huang .................. G06N 20/00

FOREIGN PATENT DOCUMENTS

EP 3678412 A1 7/2020

OTHER PUBLICATIONS

German Peinado Gomez et al., "Security policies definition and enforcement utilizing policy control function framework in 5G", Computer Communications, vol. 172, pp. 226-237, Apr. 15, 2021; available from: www.sciencedirect.com/science/article/pii/S0140366421001262.
Extended European Search Report (EESR) from the European Patent Office (EPO), dated Oct. 20, 2021, in European patent application No. EP 21176755.3.

* cited by examiner

*Primary Examiner* — Nnenna N Ekpo
(74) *Attorney, Agent, or Firm* — Eitan Mehulal Sadot

(57) ABSTRACT

System, device, and method of differentiating between streaming live-video flows and streaming non-live-video flows. A system includes a Live-Video/Non-Live-Video detector unit, connected and operable between a core cellular network and an entry node of the Internet. It monitors data packets exchanged over the core cellular network and over the Internet between a User Equipment (UE) device and a destination device. It determines that a particular communication flow between the UE device and the destination device is a streaming video communication flow. It further determines whether that streaming video communication flow is either (i) a streaming Live-Video communication flow or (ii) a streaming Non-Live-Video communication flow. It then triggers pre-defined operations, or enforces a particular traffic management or steering or shaping or charging policy, upon reaching a determination that the streaming video communication flow is a streaming Live-Video communication flow and not a streaming Non-Live-Video communication flow.

19 Claims, 4 Drawing Sheets

SYSTEM, DEVICE, AND METHOD OF DIFFERENTIATING BETWEEN STREAMING LIVE-VIDEO FLOWS AND STREAMING NON-LIVE-VIDEO FLOWS

FIELD

Some embodiments are related to the field of cellular communication networks.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments may provide systems, devices, and methods of differentiating between (i) streaming Live-Video communication flows and (ii) streaming Non-Live-Video communication flows. Some embodiments selectively apply or enforce a particular traffic handling policy, based on classification of a particular communication flow as either between (i) a streaming Live-Video communication flow or (ii) a streaming Non-Live-Video communication flow.

For example, a system includes a Live-Video/Non-Live-Video detector unit, connected and operable between a core cellular network and an entry node of the Internet. It monitors data packets exchanged over the core cellular network and over the Internet between a User Equipment (UE) device and a destination device. It determines that a particular communication flow between the UE device and the destination device is a streaming video communication flow. It further determines whether that streaming video communication flow is either (i) a streaming Live-Video communication flow or (ii) a streaming Non-Live-Video communication flow. It then triggers pre-defined operations, or enforces a particular traffic management or steering or shaping or charging policy, upon reaching a determination that the streaming video communication flow is a streaming Live-Video communication flow and not a streaming Non-Live-Video communication flow.

Some embodiments may provide other and/or additional advantages and/or benefits.

DETAILED DESCRIPTION OF SOME DEMONSTRATIVE EMBODIMENTS

Figure 1:
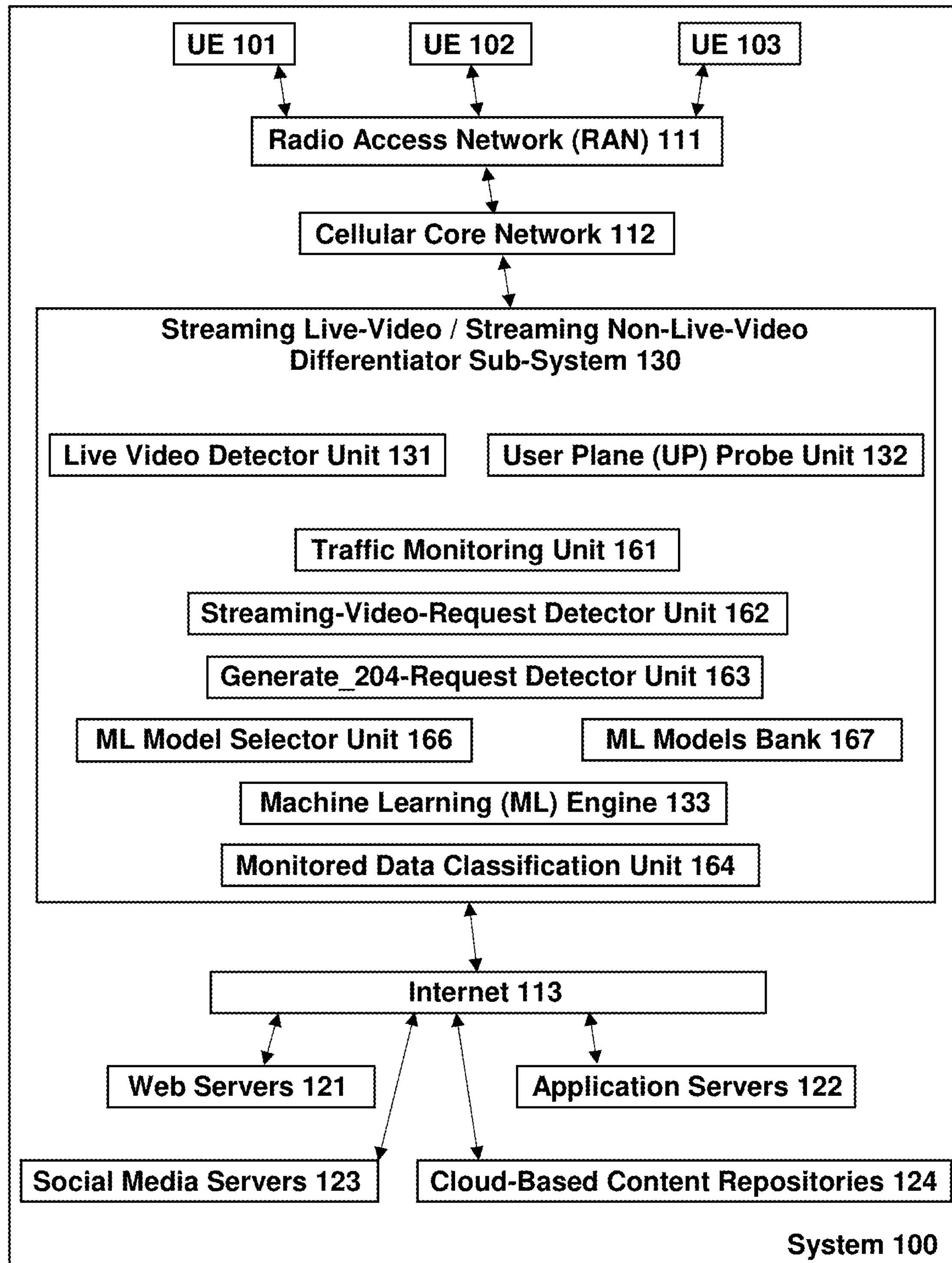
FIG. 1 is a schematic illustration of a system, in accordance with some demonstrative embodiments.

Some embodiments include devices, systems, and method for distinguishing or differentiating between (i) traffic or packets or communication sessions that carry live video, and (ii) traffic or packets or communication sessions that carry non-live video. Some embodiments include devices, systems, and method for differently handling, or differently managing, or differently controlling, or differently routing, or differently transporting, (i) traffic or packets or communication sessions that carry live video, and (ii) traffic or packets or communication sessions that carry non-live video. Some embodiments include devices, systems, and method for distinguishing or differentiating between (i) traffic or packets or communication sessions that carry live video, and (ii) traffic or packets or communication sessions that carry any other type of data (e.g., which can be non-live video, or which can be other type of data, such as text, audio, image, data file, executable file, or the like). Some embodiments include devices, systems, and method for differently handling, or differently managing, or differently controlling, or differently routing, or differently transporting, (i) traffic or packets or communication sessions that carry live video, and (ii) traffic or packets or communication sessions that carry any other type of data (e.g., which can be non-live video, or which can be other type of data, such as text, audio, image, data file, executable file, or the like).

The term "live video" as used herein may include, for example, a live video stream or data-stream or video-stream, that is being transmitted or transported or transferred to one or more recipient(s) immediately upon the fresh capturing or the fresh acquisition of such video, depicting in real-time or in near-real-time a currently-occurring event or scene; for example, each video packet representing or depicting an event that has happened no more than N seconds ago, such as, not more than 5 seconds ago (e.g., taking into account a small processing delay or encoding delay); and/or a live or generally-live video transmission, or a real-time or near-real-time video transmission or real-time event(s) or near-real-time event(s); or a transmission or a broadcast of a video that was not previously buffered or not previously stored; or a transmission or a broadcast of a video packet that was generated or encoded not more than N seconds ago (e.g., N being 5 seconds); a fresh serving or a fresh transmission of a video that was not previously posted or stored on a video repository (e.g., was not previously posted as on YouTube or Facebook for non-real-time consumption by users).

The terms "non-live video" or "Video on Demand" (VoD) as used herein may include, for example: a video file or a video stream or a video data-stream that is not a "live video" as defined above; and/or video file or a video stream or a video data-stream carrying a previously-recorded video (e.g., each video packet representing or depicting an event that has happened N or more seconds ago, such as 5 or more seconds ago); or a video that is transmitted or broadcasted at least N seconds after the capturing or the acquisition of such video in order to depicting in non-real-time previously-recorded events or scenery; for example, each video packet representing or depicting an event that has happened at least N seconds ago, such as 5 or more seconds ago (e.g., without counting in such delay a small processing delay or encoding delay that may exist even in a real-time video acquisition and transmission system); and/or a non-live video transmission or a non-live video broadcast; or a video that is not a real-time video and is not a near-real-time video; or a transmission or a broadcast of a video that was previously stored for at least N seconds prior to the actual transmission (e.g., N being 5 seconds or more); or a transmission or a broadcast of a video packet that was generated or encoded at least N seconds ago (e.g., N being 5 seconds); or a transmission or a broadcast or a serving of a video that was posted or stored on a video repository site or on a social network at least N seconds ago (e.g., was previously posted as a discrete or complete video item on YouTube or on Facebook or on TikTok); or the like.

Some demonstrative and non-limiting examples of a "live video" are, for example: a "YouTube Live" stream, or a real-time or live video stream that is broadcasted by YouTube; a "Facebook Live" stream, or a real-time or live video stream that is broadcasted by YouTube; a live video that is served or transmitted or broadcasted via a website or via a mobile application or via a desktop application, such as from a news source, e.g., a live video stream from "CNN.com" or from "FoxNews.com"; a live video conference or video chat, between or among two or more users, such as via a real-time video chat tool or via a real-time video conferencing tool, such as via Skype or Zoom or Microsoft Teams or WhatsApp; a live video stream of a game or a gameplay or a computer game or an Internet game, such as via Twitch or "YouTube Gaming" or a similar tool or service.

Some demonstrative and non-limiting examples of a "non-live video" are, for example: a video that was posted on (or, was uploaded to) YouTube or on Facebook or on TikTok at least N seconds ago (e.g., N being 5 or more seconds), and is later being consumed or downloaded or watched by various users at various times; a video that was uploaded to, or posted on, a news site as part of a news article or a news item that depicts events that have already happened; a video of a previously-recorded game or gaming event or sport event; or the like.

The Applicants have realized that video content is a significant portion of Internet traffic. The Applicants have also realized that this portion continues to grow, for various reasons; for example, due to an increase in resolution of end-user devices that capture video (e.g., capturing video in Ultra High Definition (UHD) or 4K or 8K resolution); due to an increase in the number or ratio of users who utilize devices that have more advanced video cameras; due to availability of cheaper or cost-effective smartphones that are able to capture high-resolution video; due to the increase in utilization of Augmented Reality (AR) and Virtual Reality (VR) devices or gear; due to the emergence of new applications and games that utilize broadcasting of video and/or consumption of video; due to an increase in the number or the ratio of people who work remotely, or who work from home, or who work with a distributed team, and utilize video conferencing tools; due to the increase in the utilization of video conferencing tools instead of in-person meetings (e.g., due to the COVID-19 pandemic); due to an increased desire of user to share videos via social media or social networks; due to an increase in the transport of video content from content creators via streaming services (e.g., Netflix, Hulu); and/or other reasons.

The Applicants have realized that it may be beneficial to distinguish between, and to handle differently, (i) a streaming Non-Live Video (NLV) or Video-on-Demand (VD) content, and (ii) a Live Video (LV) content; and to apply or enforce different traffic handling policies on these two different types of video streams.

The Applicants have realized that such differentiation may be important and/or useful in various situations or due to various reasons.

Firstly, Live Video is more sensitive to packet loss; a server that serves (or, a device that captures and transmits) Live Video typically does not re-send and does not re-transmit a lost video packet (e.g., a video packet that was transmitted but did not arrive to the intended recipient); whereas a server of a Non-Live Video can typically re-send or re-transmit such lost video packets. For example, a user who participates in a Live Video video-conferencing meeting with business associates, and is watching an important business idea presented over video, is expected to suffer more from video packet loss and frame drop, compared to a home user who watches a non-live animated movie on YouTube for leisure and that would typically not be negatively affected by occasional packet loss or frame drops.

Secondly, the utilization of Live Video enables end-users to share with others, in real-time or in near-real-time (e.g., with a slight delay of very few seconds due to processing and encoding), an event or a scene that is currently occurring or that is currently being observed; thereby enabling virtually any user equipped with a smartphone to become an ad-hoc reporter or journalist of live events, without the need to locally store such video or to edit it via a video editing tool prior to such live broadcast. In some situations, a Communication Service Provider (CSP) or may be required to control (or, may wish to control) such Live Video, in order to ensure compliance with its own terms-of-use or terms-of-service, or in order to comply with legal requirements or regulations. For example, the Live Video service of YouTube Live or Facebook Live, may wish to prevent or to stop a Live Video that an end-user is streaming which depicts a violent scene, or a Live Video scene that depicts naked people.

Thirdly, a CSP may wish to provide a different level of Quality of Service (QoS) or Quality of Experience (QoE) with regard to Live Video, compared to Non Live Video. For example, a CSP may wish to provide a higher level of QoS or QoE with regard to a Live Video of an ongoing video conferencing tool that a business user is utilizing via Skype or Teams or Zoom or WhatsApp; and/or may wish to provide a lower level of QoS or QoE with regard to a Non Live Video that is being consumed by a home user watching an animated movie on YouTube.

Reference is made to FIG. 1, which is a schematic block-diagram illustration of a system 100, in accordance with some demonstrative embodiments. System 100 may be or may include, for example, a communication network, a cellular 4G Long Term Evolution (LTE) communication network, a 5G communication network, or the like.

A plurality of User Equipment (UE) devices are shown, for example, UEs 101-103. Each UE may be, for example, a smartphone, a tablet, a smart-watch, a laptop computer, a desktop computer, an Internet-connected device, or the like. In some embodiments, a particular UE is held by or carried by or utilized by a particular end-user; such as, a person holding a smartphone. In other embodiments, a particular UE is not necessarily associated with a particular user or set of users; for example, a UE may be an Internet-connected security camera, or an Internet-connected display unit, or the like.

Each UE may communicate with a Radio Access Network (RAN) 111; which in turn enables communication of the UE with a cellular Core Network 112; which in turn enables communication of the UE with the Internet 113; which in turn enables the UE to communicate with various web servers 121, application servers 122, social media servers 123, cloud-based content repositories 124, or the like.

In accordance with some embodiments, a Streaming Live-Video/Streaming Non-Live-Video Differentiator Sub-System 130 is introduced into system 100; for example, connected or located or operable at a node or location that is between (i) the cellular Core Network 112, and (ii) the Internet 113 (or an entry node to the Internet or n entry point to the Internet).

For example, the Streaming Live-Video/Streaming Non-Live-Video Differentiator Sub-System 130 includes a Live Video Detector Unit 131 (which may also be referred to as a Live-Video/Non-Live-Video Detector Unit) and a User Plane Probe Unit 132.

The Live Video Detector Unit 131 is an active in-line network element or network function or network component, able to detect a Live Video communication flow or a Live Video communication session or a Live Video communication connection (including, in some embodiments, detection of a Live Video flow that is split or divided across multiple communication connections). Upon detection of a Live Video session or flow, the Live Video Detector Unit 131 sends a live video detection message or a live video detection to one or more relevant components of the cellular Core Network 112, such as a Policy Control Function (PCF) or a Policy and Charging Rules Function (PCRF), in order to trigger enforcement of one or more pre-defined policies or rules with regard to such traffic. The live video detection message may include or may indicate, for example, an identifier of the detected flow or session that was detected by the Live Video Detector Unit 131 as Live Video.

User Plane Probe Unit 132 is an active in-line network element or network function, which monitors and analyzes the upstream traffic and the downstream traffic of the User Plane, and generates and provides the relevant metadata to the Live Video Detector Unit 131 (e.g., packet length, the number of packets in the specific time unit, frequency of packet transmission or packet reception, meta-data obtained or extracted or derived from Transport Layer Security (TLS) handshake which is typically 517 bytes long) or other metadata per a specific packet type).

For example, the User Plane Probe Unit 132 detects a "Streaming Video Request" message and/or a "Generate_204 Request" message; and sends to the Live Video Detector Unit 131 metadata indicating message length, Internet Protocol (IP) of the video consuming device, Operating System (OS) type and/or version of the video consuming device, and application type or application identifier.

In some embodiments, one or more suitable units or sub-units may assist in the detection process. For example, a Traffic Monitoring Unit 161 (or, two or more of such monitoring units) may be part of the Live Video Detector Unit 131 and/or the User Plane Probe Unit 132, and/or may be operably associated with the Live Video Detector Unit 131 and/or the User Plane Probe Unit 132; and may perform traffic monitoring, traffic analysis, classification of packets into classes or categories or types, measurement of elapsed time, measurement of packet size or message size, monitoring or obtaining of metadata about the relevant UE device, or the like. Optionally, a Streaming-Video-Request Detector Unit 162 may perform the operations of monitoring packets or traffic and detecting the Streaming-Video-Request message or signal; and such Streaming-Video-Request Detector Unit 162 may be part of the Live Video Detector Unit 131 and/or the User Plane Probe Unit 132, and/or may be operably associated with the Live Video Detector Unit 131 and/or the User Plane Probe Unit 132. Optionally, a Generate_204-Request Detector Unit 163 may perform the operations of monitoring packets or traffic and detecting the Generate_204 Request message or signal; and such Generate_204-Request Detector Unit 163 may be part of the Live Video Detector Unit 131 and/or the User Plane Probe Unit 132, and/or may be operably associated with the Live Video Detector Unit 131 and/or the User Plane Probe Unit 132.

In some embodiments, the Live Video detection may be performed by using a Machine Learning (ML) engine 133, which may be part of the Live Video Detector Unit 131 or may be operably associated with it. The Live Video detection may further be based on, or may be ML trained by, or may further take into account, information about the Operating System (OS) of the UE, the particular type of the browser or video consumption application running on the UE, the packet length or packet size, the packet arrival time, and/or other information. For example, in order to transport or transfer Video content, the client-side device typically opens several connections with the server; to associate all these connections with the same Video streaming session, an Arrival Time indicator is utilized and may be detected (for example, all the multiple connections received response on STREAMING_REQUEST within a 30-seconds time-window are related to the same video session).

For example, the Live Video Detector Unit 131 feeds the data through the ML Engine 133, which applies a pre-defined or a previously-trained ML model to distinguish between Live Video and Non-Live Video. Upon detection of a Live Video flow, the Live Video Detector Unit 131 sends a live video detection message to the PCF or PCRF or other Policy Control entity in CSP network, in order to trigger there further selective handling (if applicable, based on pre-defined traffic policy, traffic shaping policy, charging rules, traffic prioritization rules, or other criteria).

Optionally, a Monitored Data Classification Unit 164 may perform the classification or the categorization of a particular packet or communication flow, using the Machine Learning engine and model described herein, and/or using other suitable methods (e.g., optionally utilizing Deep Packet Inspection (DPI) via a DPI analysis engine); and the Monitored Data Classification Unit 164

In some embodiments, Live Video may be detected based on, or by taking into account, one or more insights that are generated by the system with regard to STREAMING_REQUEST signal(s) or indicator(s) or data-item(s) or control item(s), or a "Get Media URL Request" message or signal or indicator or data-item, that are detected and analyzed by the system. The STREAMING_REQUEST (or in some implementations, the Get Media URL Request) is a request for streaming data frames; and the system may detect multiple requests with different sizes that appear in (or that are associated with) the same single video session (which may contain more than one client-server connection). Some embodiments may perform the detection of Live Video based on (or, by taking into account also) the minimum size of the first Streaming Request among the multiple streaming video connections that are associated with a single video session, such as, based on the value of a "Minimum First Streaming Request Size" parameter. Additionally or alternatively, some embodiments may perform the detection of Live Video based on (or, by taking into account also) an array (or group, or set) of sizes of N sequential Streaming Requests, wherein N is a pre-defined value that is selected from a list of pre-defined values that correspond to different Applications that were detected by the DPI engine (e.g., N may be pre-defined as 3 for Streaming Requests that are determined, based on DPI analysis, to be addressed to Facebook.com), such as, based on a "Sequence of Streaming Requests" parameter.

Additionally or alternatively, some embodiments may perform the detection of Live Video based on (or, by taking into account also) the size (e.g., in bytes) of the "Generate 204 Request" message; for example, particularly if the DPI-based analysis has detected that the video streaming request is directed to YouTube, since the "Generate 204 Request" message is used by a YouTube client to initiate video streaming from a YouTube server.

Additionally or alternatively, Some embodiments may perform the detection of Live Video based on (or, by taking into account also) the feature of True or False with regard to whether there exists a small packet which follows the Streaming Request; wherein a "small packet" is defined as a packet having not more than N bytes, wherein N is a pre-defined value that is selected from a lookup table of pre-defined values that correspond to different servers or applications that are detected by DPI analysis. For example, this feature is True if a "small packet" follows the Streaming Request, since some particular client-side applications that request a streaming video send to the streaming server a "small packet" immediately after or immediately following the first Streaming Request. This feature may be a Boolean (True or False) parameter of "Small-Packet Follows First-Streaming-Request".

Figure 2:
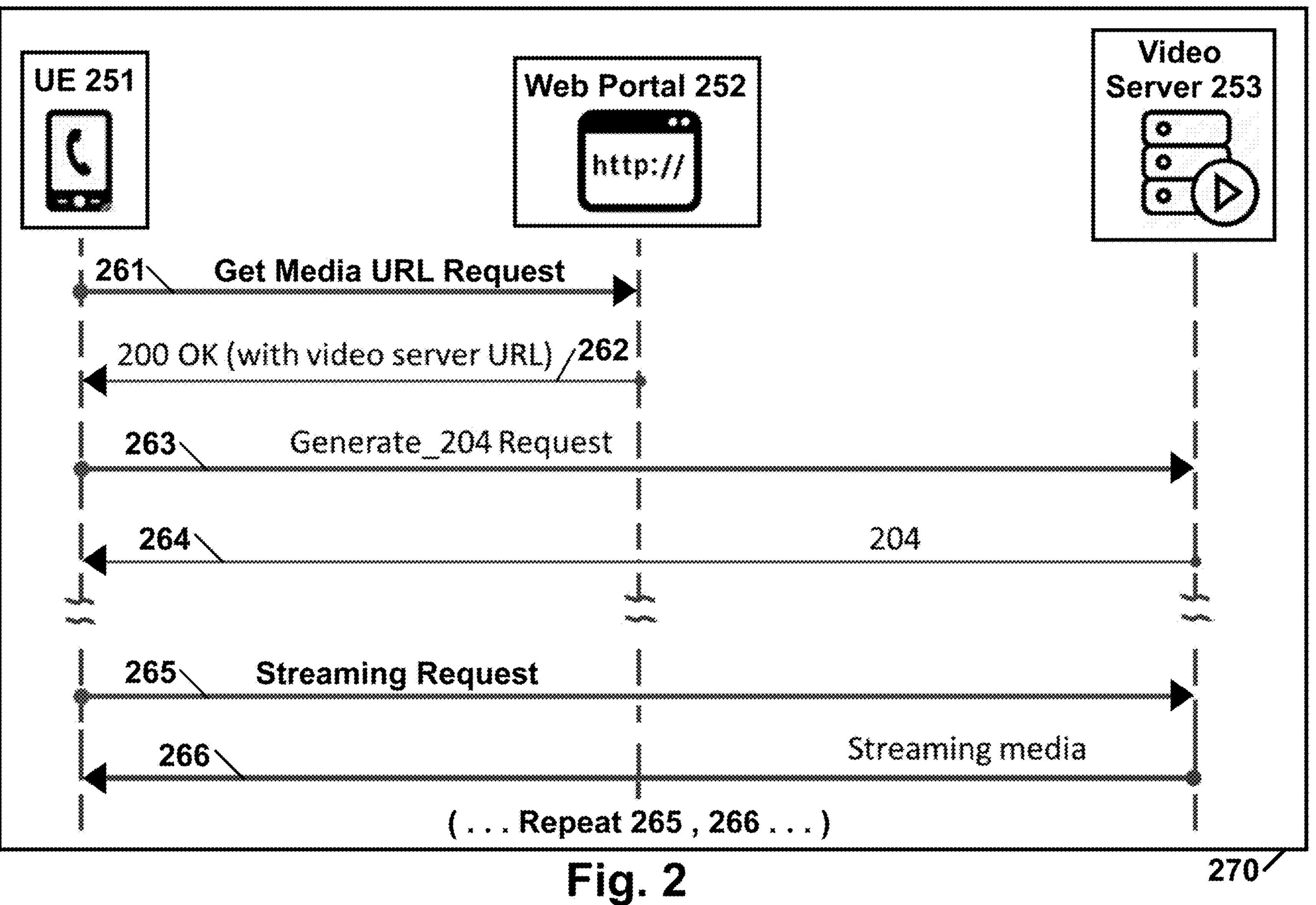
FIG. 2 is a schematic illustration of a flow of video streaming initiation, which may be utilized as part of a Live Video/Non-Live Video differentiation process, in accordance with some demonstrative embodiments.

Reference is made to FIG. 2, which is a schematic illustration of a video streaming initiation flow 270 which may be utilized as part of a Live Video/Non-Live Video differentiation process, in accordance with some demonstrative embodiments. For example, a UE device 251 (e.g., running a web browser, or a video consumption application or "app", or a video playback application or "app") may initiate a streaming video via a Web Portal 252, which is a front-end portal or element that utilizes a lookup engine to generate and provide to the UE 251 a Uniform Resource Locator (URL) of a server 253 that stores or that serves the desired video, and further performs DNS resolution to provide the URL of the particular server that is located as close as possible to the particular UE device 251.

As demonstrated, a Get Media URL Request is sent from the UE to the Web Portal (arrow 261). The Web Portal responds by sending back a "200 OK" response message, which includes the URL of the location of the particular media item on the particular video server that will serve it to the UE (arrow 262). Then, the UE sends a "Generate_204 Request" message, directly to the video server (arrow 263); which responds with a "204" response (or a "204 no content" response (arrow 264); which is followed by a Streaming Request from the UE (arrow 265), and is then followed by the server performing the streaming of the video to the UE (arrow 266). As indicated at the bottom of the diagram, steps 265 and 266 may be repeated; such that, the diagram may continue with pairs of messages similar to 265 and 266.

Figure 3:
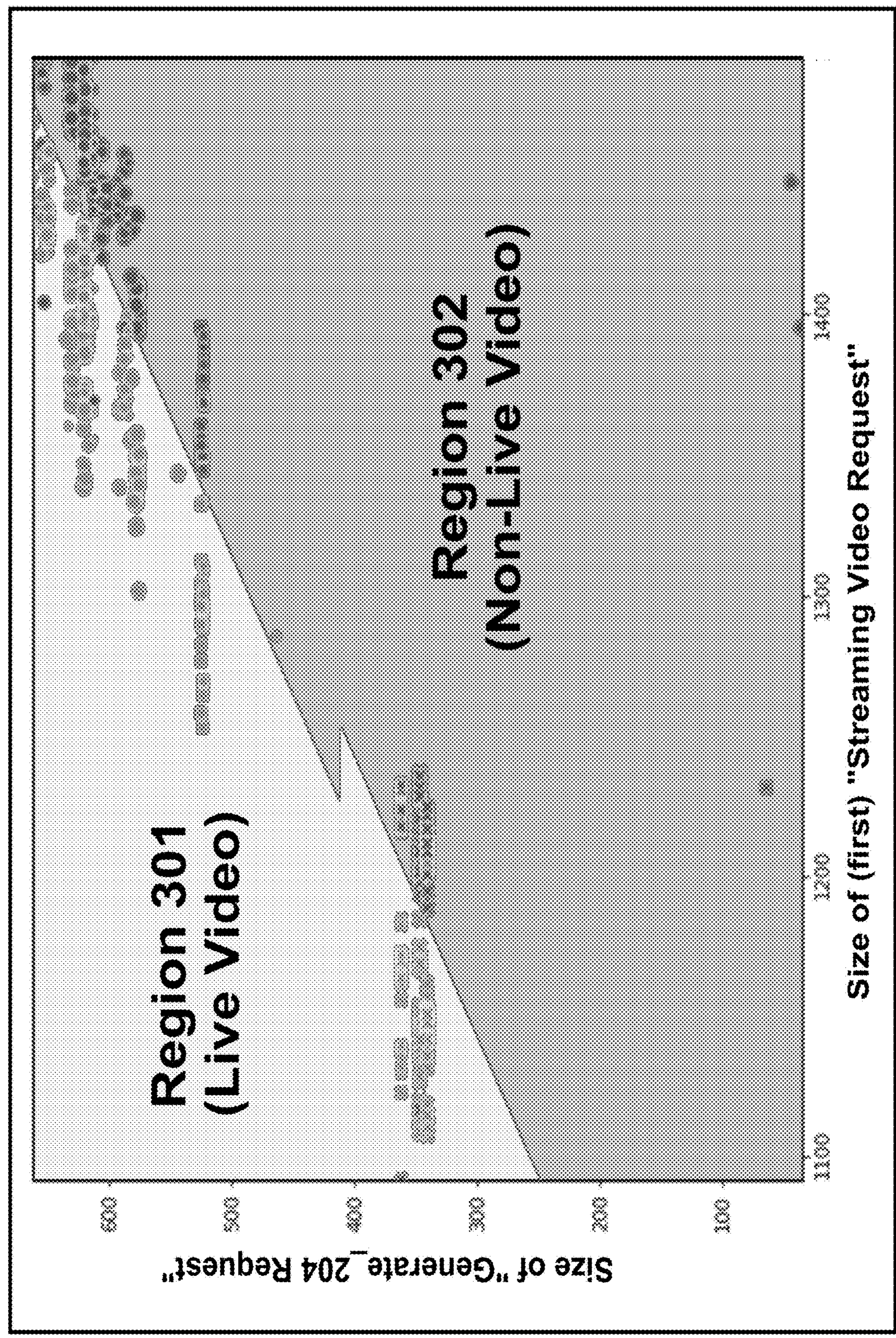
FIG. 3 is a schematic illustration of a two-dimensional separator Machine Learning (ML) model, which may be utilized as part of a Live Video/Non-Live Video differentiation process, in accordance with some demonstrative embodiments.

Reference is made to FIG. 3, which is a schematic illustration of a decision surface of a two-dimensional separator ML model 300, which may be utilized as part of a Live Video/Non-Live Video differentiation process, in accordance with some demonstrative embodiments.

A first feature of the ML model (e.g., parameter "x" of the two-dimensional ML model) is the size (e.g., in bytes) of "Streaming Video Request" (or, of the first such streaming video request out of several that are associated with the same single communication flow); as it may have different values for various different UE applications that request streaming videos (e.g., Facebook application, YouTube application), and/or for various different browser types that may run on the UE (e.g., Chrome, Firefox, Edge, Safari, Opera), and/or for various different Operating Systems that may run on the UE (e.g., Windows, iOS, Android, Linux).

A second feature of the ML model (e.g., parameter "y" of the two-dimensional model) is the size (e.g., in byte) of the "Generate_204 Request", which is part of the video streaming negotiation flow.

In a demonstrative example, the two-dimensional ML model for separation of Live Video flows and Non-Live Video flows may be described as follows:

$$IsLV = [\text{TRUE; FALSE}] = \begin{cases} x - y < fa(OS, \text{Browser}) \\ fb(OS, \text{Browser}) < y < fc(OS, \text{Browser}) \end{cases}$$

It is noted that the above is only a demonstrative example of a model, and other suitable models may be used, as detailed further herein.

In the demonstrative example shown in FIG. 3, all cases that are located within Region 301 (e.g., north-west relative to the separator line or the separator pattern) should be interpreted as Live Video cases; whereas, all cases that are located within Region 302 (e.g., south-east relative to the separator line or the separator pattern) should be interpreted as Non-Live Video cases.

In some embodiments, the system and method perform a classification of a particular communication flow, into one out of exactly two possible classifications or determination results: (i) the communication flow is a streaming Live Video communication flow, or (ii) the communication flow is a streaming Non-Live Video communication flow.

In some embodiments, the system and method perform a classification of a particular communication flow, into one out of exactly three possible classifications or determination results: (i) the communication flow is a streaming Live Video communication flow, or (ii) the communication flow is a streaming Non-Live Video communication flow, or (iii) the communication flow is a streaming communication flow that is neither one of the above two other types (e.g., the communication flow is a streaming non-video live audio communication flow).

In some embodiments, the system and method perform a classification of a particular communication flow, into one out of exactly three possible classifications or determination results: (i) the communication flow is a streaming Live Video communication flow, or (ii) the communication flow is a streaming Non-Live Video communication flow, or (iii) the communication flow is a non-streaming video communication flow (e.g., the communication flow is a download of a static non-streaming video file, such as an AVI video file or a MKV video file that is being downloaded into the UE device as an attached file via an email application in response to a "save attachment" command by the end-user).

In some embodiments, the system and method perform a classification of a particular communication flow, into one out of exactly three possible classifications or determination results: (i) the communication flow is a streaming Live Video communication flow, or (ii) the communication flow is a streaming Non-Live Video communication flow, or (iii) the communication flow is a non-streaming communication flow (e.g., the communication flow is a download of a PDF file).

Referring back to FIG. 1, in some embodiments, optionally, a Deep Packet Inspection (DPI) Engine 146 may perform DPI analysis of current and/or previously-transported traffic or packets, to determine which application(s) is (or are) currently associated with a particular UE (or communication flow, or communication connection). In some embodiments, the detection model(s) or the classification model(s) may be implemented on top of the DPI engine, and may use DPI analysis results or DPI-based insights or information (e.g., packet size, observers, directions, or the like). Furthermore, the DPI engine may triage the traffic and route or re-route it to the most suitable model based on one or more pre-defined rules or conditions that indicate to the system which model to apply to which particular type of traffic.

Figure 4:
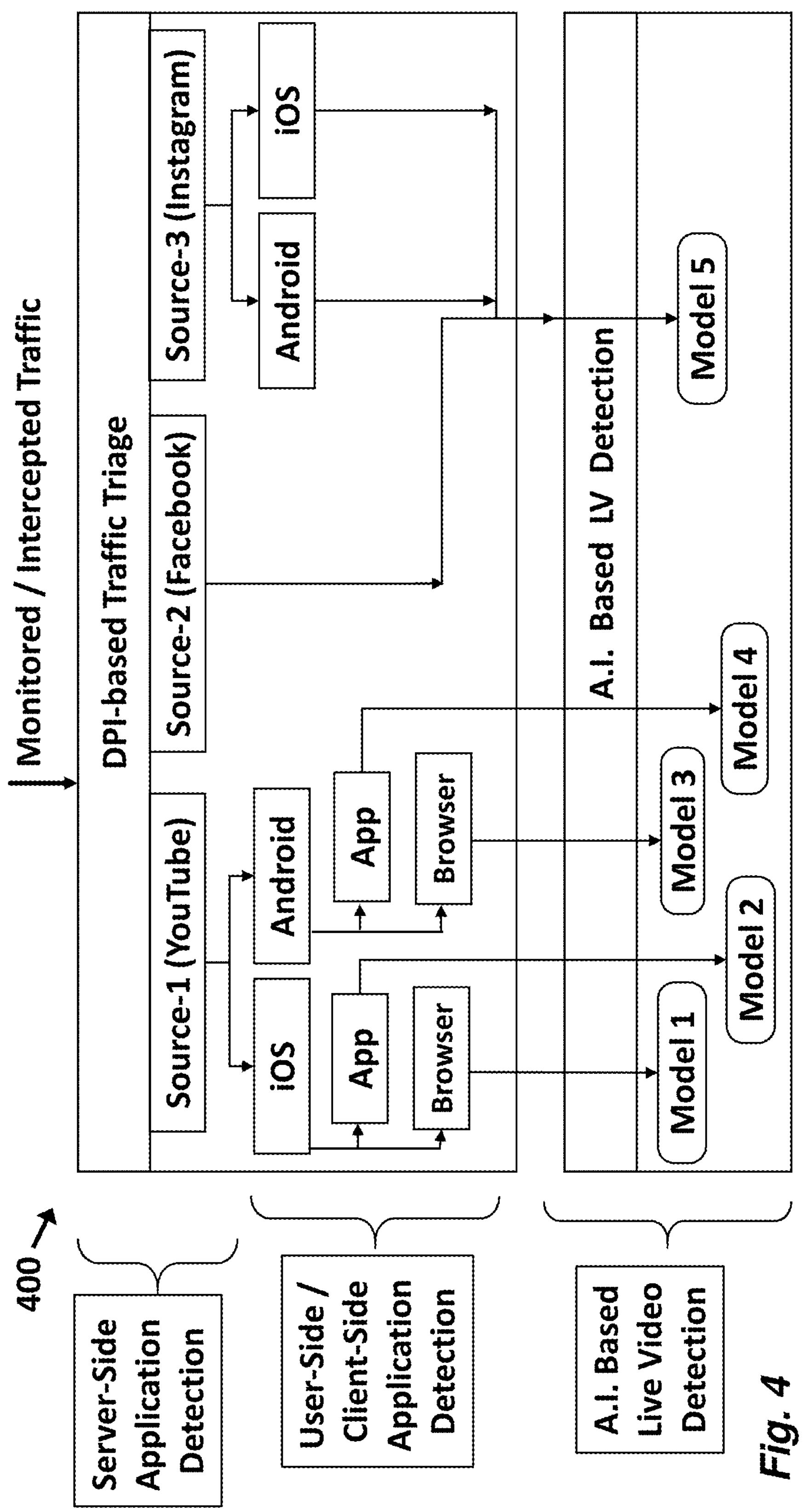
FIG. 4 is a schematic illustration of a diagram demonstrating a process of Live Video detection, in accordance with some demonstrative embodiments.

Reference is made to FIG. 4, which is a schematic illustration of a diagram 400 demonstrating a process of Live Video detection, in accordance with some demonstrative embodiments. As shown on the left side of the drawing, a server-side application detection process is performed in combination with a user-side/client-side application detection process, to enable and an AI-based Live Video detection process which selectively utilizes a particular model out of several pre-defined models, the selection being based on the application detection results.

For example, monitored/intercepted traffic is fed into the DPI engine, which performs DPI-based traffic triage: it may classify the traffic (e.g., the traffic that originates from a streaming video server, direct to a client device or an end-user device) into a particular type of application or source, for example, streaming video of Source-1 (e.g., YouTube), streaming video of Source-2 (e.g., Facebook), streaming video of Source-3 (e.g., Instagram). Additionally, user-side/client-side application detection may be performed, by classifying traffic that is outgoing from the client/end-user to the streaming server; in order to detect an Operating System of the client (the end-user device), and/or in order to determine whether the end-user device is consuming or accessing the streaming video via a dedicated application ("app") or via a Web browser.

Such multiple layers of classification may be beneficial since, realized the Applicants, different features and different characteristics may be associated with streams of Live Video (or, conversely, with streams of Non-Live Video) when such streams originate from a particular Source, and/or when such streams are requested by a particular Operating System, and/or when such streams are requested by a particular type of requesting application (e.g., a dedicated/native app, or a general browser application).

Based on the multiple layers of classification, the detected features enable the system to select which particular Model, out of several pre-defined models (e.g., shown in the drawing as models 1 through 5) to apply for the purpose of determining whether this particular streaming video is a Live Video or a Non-Live Video; in order to then trigger deployment of one or more traffic handling operations or traffic management operations.

The following are some non-limiting examples of models, which may be selected and utilized based on the detected characteristics, in accordance with some demonstrative embodiments. Other suitable models may be used, based on (or taking into account) other parameters or data or meta-data. Optionally, two or more models may be applied, in series or in parallel or consecutively; for example, in order to gradually fine-tune the decision and to reach a finer or more accurate determination or classification.

Model 1, which may be suitable for classifying a video stream that is determined to be from YouTube (e.g., and not from Facebook and not from Instagram), and is determined to be requested by an end-user device or by a UE device running iOS operating system (e.g., and not Windows and not Android), and is determined to be requested by Safari browser (e.g., and not by the native YouTube application or "app"), may be used to distinguish between a Live Video and a Non-Live Video by using the following rule (which uses a pre-defined threshold value, denoted "Threshold_1"):

```
Is_Live-Video [True; False]=
IF
    (Minimum_First_Streaming_Request_Size>Threshold_1)
```

Model 2, which may be suitable for classifying a video stream that is determined to be from YouTube (e.g., and not from Facebook and not from Instagram), and is determined to be requested by an end-user device or by a UE device running iOS operating system (e.g., and not Windows and not Android), and is determined to be requested by the native YouTube application or "app" (e.g., and not by Safari browser), may be used to distinguish between a Live Video and a Non-Live Video by using the following rule (which uses a pre-defined threshold value, denoted "Threshold_2"):

```
Is_Live-Video [True; False]=
IF
    (Minimum_First_Streaming_Request_Size<Threshold_2)
```

Model 3, which may be suitable for classifying a video stream that is determined to be from YouTube (e.g., and not from Facebook and not from Instagram), and is determined to be requested by an end-user device or by a UE device running Android operating system (e.g., and not Windows and not iOS), and is determined to be requested by Chrome browser (e.g., and not by the native YouTube application or "app"), may be used to distinguish between a Live Video and a Non-Live Video by using the following rule (which uses pre-defined threshold values, denoted "Threshold_3" and "Threshold_4" and "Threshold_5"):

```
Is_Live-Video [True; False]=
(IF (Generate_204_Request_Size<Threshold_3) &
IF (Minimum_First_Streaming_Request_Size–
    Generate_204_Request_Size)<Threshold_4))
OR
(IF (Generate_204_Request_Size>=Threshold_3) &
IF (Minimum_First_Streaming_Request_Size–
    Generate_204_Request_Size<Threshold_5))
```

Model 4, which may be suitable for classifying a video stream that is determined to be from YouTube (e.g., and not from Facebook and not from Instagram), and is determined to be requested by an end-user device running Android operating system (e.g., and not Windows and not iOS), and is determined to be requested by the native YouTube application or "app" (e.g., and not by a web browser), may be used to distinguish between a Live Video and a Non-Live Video by using the following rule (which uses a pre-defined threshold value, denoted "Threshold_6"):

```
Is_Live-Video [True; False]=
IF (Small_Following_Packet
  OR
    Minimum_First_Streaming_Request_Size<Threshold_6)
```

Model 5, which may be suitable for classifying a video stream that is determined to be from Facebook or from Instagram (e.g., and not from YouTube), regardless of the Operating System of the end-user device and regardless of the type of the requesting client-side software (e.g., browser or native app), may be used to distinguish between a Live Video and a Non-Live Video by using the following rule (which uses pre-defined threshold values, denoted "Threshold_7" and "Threshold_8"; for example, in a demonstrative implementation, for Facebook video streams, using Threshold_7 of 100 bytes, using Threshold_8 of 250 bytes, and wherein "Sequence of Streaming Requests" includes the size of three sequential streaming requests):

Is_Live-Video [True; False]=

IF (Threshold_7<Sequence_Of_Streaming_Requests< Threshold_8)

For example, a system that utilizes Model 5 may check, whether in a window of N outgoing packets, M outgoing packets (wherein M<N) were between Threshold_7 and Threshold_8; and if the check result is positive, then Live Video is detected. In a demonstrative numerical example, the system may define a window of 5 outgoing packets (e.g., outgoing from the same end-user device); and the system may check whether at least three of those outgoing packets have a size (in bytes) that is between 100 bytes and 250 bytes. If the check result is positive (e.g., the sequence of five outgoing packets has packet-size of 50, 120, 50, 120, 120 bytes), then it is Live Video. If the check result is negative (e.g., the sequence of five outgoing packets has packet-size of 50, 600, 50, 50, 50 bytes), then it is not Live Video (or: it is Non-Live Video).

The above are only non-limiting examples, and other suitable features, rules, and models may be used in accordance with various embodiments.

The selection of which Model to apply, may be performed by an ML Model Selector Unit 166 which may be part of the Streaming Live-Video/Streaming Non-Live-Video Differentiator Sub-System 130 of FIG. 1. For example, a bank or pool or database of several Models, such as an ML Models Pool 167, may be pre-stored or pre-defined, with each Model relying on (or utilizing) one or more particular characteristics or features or indicators or signals or parameters, and with each Model utilizing particular threshold values for each such parameter; each Model being pre-defined as being suitable for utilization if a particular combination of features is determined (e.g., from DPI analysis of traffic, and/or from analysis of client-side or user-side video streaming requests and their meta-data); for example, each Model being pre-defined as suitable for a particular combination of (a) Source server identity (e.g., YouTube or Facebook) and (b) Operating System of the requesting end-user device (e.g., Android or iOS) and (c) type of requesting application of the end-user device (e.g., specific native application, or general Web browser).

Some embodiments include a system comprising: a Live-Video/Non-Live-Video detector unit, connected and operable between a core cellular network and an entry node of the Internet; which is configured or adapted: to monitor data packets exchanged over said core cellular network and over the Internet between a User Equipment (UE) device and a destination device; and to determine that a particular communication flow between the UE device and the destination device is a streaming video communication flow; and to further determine whether said streaming video communication flow is either (i) a streaming Live-Video communication flow or (ii) a streaming Non-Live-Video communication flow; and to trigger deployment or activation of one or more pre-defined operations if said Live-Video/Non-Live-Video detector unit determines that said streaming video communication flow is a streaming Live-Video communication flow and not a streaming Non-Live-Video communication flow. It may trigger one or more pre-defined operations, or may enforce or apply a particular traffic management or steering or shaping or charging policy or rule(s), upon reaching a determination that the streaming video communication flow is a streaming Live-Video communication flow and not a streaming Non-Live-Video communication flow.

In some embodiments, if said Live-Video/Non-Live-Video detector unit determines that said streaming video communication flow is a streaming Live-Video communication flow and not a streaming Non-Live-Video communication flow, then said Live-Video/Non-Live-Video detector unit is to send a Streaming Live Video Detection Message to at least one of: (I) a Policy Control Function (PCF) unit of said cellular core network, (II) a Policy and Charging Rules Function (PCRF) unit of said cellular core network, wherein said Streaming Live Video Detection Message triggers enforcement of a pre-defined traffic handling policy on said streaming Live-Video communication flow.

In some embodiments, said Streaming Live Video Detection Message is generated based on detection of said streaming Live-Video communication flow externally to said cellular communication network, and wherein said Streaming Live Video Detection Message provides to at least one network element of said cellular communication network at least a flow identifier of said streaming Live-Video communication flow to enable enforcement of said pre-defined traffic handling policy on said streaming Live-Video communication flow.

In some embodiments, said Live-Video/Non-Live-Video detector unit determines that said streaming video communication flow is a streaming Live-Video communication flow and not a streaming Non-Live-Video communication flow, by utilizing a Machine Learning (ML) Engine that applies a pre-defined ML model on values of at least two metadata parameters of said streaming video communication flow to classify said streaming video communication flow as either Live-Video or Non-Live-Video.

In some embodiments, the ML model that is applied by the ML engine is a two-dimensional separator ML model.

In some embodiments, the ML model that is applied by the ML engine is a two-dimensional separator ML model which classifies a communication flow as either Live-Video or Non-Live-Video based at least on: a size in bytes of a Streaming Request that is sent by the UE device to a web portal that conveys to said UE device a particular URL of said destination device.

In some embodiments, the ML model that is applied by the ML engine is a two-dimensional separator ML model which classifies a communication flow as either Live-Video or Non-Live-Video based at least on: a size in bytes of a Generate_204 Request that is sent by the UE device to said destination device.

In some embodiments, the ML model that is applied by the ML engine is a two-dimensional separator ML model which classifies a communication flow as either Live-Video or Non-Live-Video based at least on: (i) an X parameter corresponding to a size in bytes of a Streaming Video Request that is sent by the UE device to a web portal that conveys to said UE device a particular URL of said destination device, and (ii) a Y parameter corresponding to a size in bytes of a Generate_204 Request that is sent by the UE device to said destination device.

In some embodiments, the ML model that is applied by the ML engine is a two-dimensional separator ML model which classifies a communication flow as either Live-Video or Non-Live-Video based on an ML training set that is constructed based on data-points indicating at least: (i) an Operating System of each UE device utilized in the ML training set, and (ii) a browser type of each UE device utilized in the ML training set, and (iii) a type of video consumption application of each UE device utilized in the ML training set, and (iv) packet size in bytes, and (v) packet arrival time.

In some embodiments, the Live-Video/Non-Live-Video detector unit comprises an ML model selector unit, to automatically select a particular ML model that would be applied by said ML engine, based on (i) an identity of a source of said communication source, and also (ii) a type of Operating System which runs on the UE device, and also (iii) a type of application that runs on the UE device and that was utilized for requesting the streaming video from said source.

In some embodiments, the Live-Video/Non-Live-Video detector unit comprises an ML model selector unit, to automatically select a particular ML model that would be applied by said ML engine, based on both (I) Deep Packet Inspection (DPI) analysis of said traffic, and (II) analysis of characteristics of one or more video streaming requests that are generated by said UE device.

In some embodiments, said ML model selector unit is configured to select a particular ML model which utilizes at least the following feature: a result of a comparison between (i) a minimum size of the first Streaming Request among multiple streaming video connections that are associated with a single video session, and (ii) a pre-defined threshold value.

In some embodiments, said ML model selector unit is configured to select a particular ML model which utilizes at least the following feature: a result of a comparison between (i) a size in bytes of a Generate_204 Request associated with a single video session, and (ii) a pre-defined threshold value.

In some embodiments, said ML model selector unit is configured to select a particular ML model which utilizes at least the following two features: (I) a result of a comparison between (i) a size in bytes of a Generate_204 Request associated with a single video session, and (ii) a pre-defined threshold value; (II) a size of a difference between (a) said size in bytes of the Generate_204 Request, and (b) a minimum size of the first Streaming Request among multiple streaming video connections that are associated with a single video session.

In some embodiments, said ML model selector unit is configured to select a particular ML model which utilizes at least the following feature: a detection whether a video streaming request, that originated from the UE device, is immediately followed by a small packet, wherein a small packet is pre-defined as a packet having less than N bytes, wherein N is a pre-defined threshold value.

In some embodiments, said ML model selector unit is configured to select a particular ML model which utilizes at least the following feature: a feature that (a) defines a window of N consecutive outgoing packets that are outgoing from the UE device and that are associated with a same single streaming video, and (b) performs a check whether at least M outgoing packets, out of said N consecutive outgoing packets, wherein $M<N$, have individually a byte-size that is greater than a first threshold value $V1$ and is smaller than a second threshold value $V2$; and (c) reaches a Live Video determination if the check result is positive, and reaches a Non Live Video determination if the check result is negative; wherein the threshold values $V1$ and $V2$ are pre-defined based on an identity of a source server that was requested by the UE device to stream said single streaming video to said UE device.

In some embodiments, if said Live-Video/Non-Live-Video detector unit determines that said streaming video communication flow is a streaming Live-Video communication flow and not a streaming Non-Live-Video communication flow, then said streaming video communication flow is assigned a higher transport priority relative to another streaming video communication flow that is determined to be a streaming Non-Live-Video communication flow.

In some embodiments, if said Live-Video/Non-Live-Video detector unit determines that said streaming video communication flow is a streaming Live-Video communication flow and not a streaming Non-Live-Video communication flow, then said streaming video communication flow is assigned a higher transport priority relative to another streaming video communication flow that is determined to be a non-video communication flow.

Some embodiments include a computerized method comprising: (a) deploying a Live-Video/Non-Live-Video detector unit, connected and operable between a core cellular network and an entry node of the Internet; (b) monitoring data packets exchanged over said core cellular network and over the Internet between a User Equipment (UE) device and a destination device; (c) determining that a particular communication flow between the UE device and the destination device is a streaming video communication flow; (d) further determining whether said streaming video communication flow is either (i) a streaming Live-Video communication flow or (ii) a streaming Non-Live-Video communication flow; (e) triggering deployment of one or more pre-defined operations if it was determined in step (d) that said streaming video communication flow is a streaming Live-Video communication flow and not a streaming Non-Live-Video communication flow; wherein the method is implemented by at least a hardware processor.

Some embodiments comprise a non-transitory storage medium having stored thereon instructions that, when executed by one or more hardware processors, cause the one or more hardware processors to perform a method as described above.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments, may be combined with, or may be utilized in combination with, one or more other functions, operations, components and/or features described herein with reference to one or more other embodiments. Some embodiments may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:

a Live-Video/Non-Live-Video detector unit, connected and operable between a core cellular network and an entry node of the Internet, to monitor data packets exchanged over said core cellular network and over the Internet between a User Equipment (UE) device and a destination device, and to determine that a particular communication flow between the UE device and the destination device is a streaming video communication flow, and to further determine whether said streaming video communication flow is either (i) a streaming Live-Video communication flow or (ii) a streaming Non-Live-Video communication flow;

and to trigger deployment of one or more pre-defined operations if said Live-Video/Non-Live-Video detector unit determines that said streaming video communication flow is a streaming Live-Video communication flow and not a streaming Non-Live-Video communication flow;

wherein the Live-Video/Non-Live-Video detector unit comprises a Machine Learning (ML) model selector unit, configured to select a particular ML model which utilizes at least the following feature: a feature that (a) defines a window of N consecutive outgoing packets that are outgoing from the UE device and that are associated with a same single streaming video, and (b) performs a check whether at least M outgoing packets, out of said N consecutive outgoing packets, wherein $M<N$, have individually a byte-size that is greater than a first threshold value V1 and is smaller than a second threshold value V2; and (c) reaches a Live Video determination if the check result is positive, and reaches a Non Live Video determination if the check result is negative;

wherein the threshold values V1 and V2 are pre-defined based on an identity of a source server that was requested by the UE device to stream said single streaming video to said UE device.

2. The system of claim 1, wherein if said Live-Video/Non-Live-Video detector unit determines that said streaming video communication flow is a streaming Live-Video communication flow and not a streaming Non-Live-Video communication flow, then said Live-Video/Non-Live-Video detector unit is to send a Streaming Live Video Detection Message to at least one of: (I) a Policy Control Function (PCF) unit of said cellular core network, (II) a Policy and Charging Rules Function (PCRF) unit of said cellular core network, wherein said Streaming Live Video Detection Message triggers enforcement of a pre-defined traffic handling policy on said streaming Live-Video communication flow.

3. The system of claim 1, wherein said Streaming Live Video Detection Message is generated based on detection of said streaming Live-Video communication flow externally to said cellular communication network, and wherein said Streaming Live Video Detection Message provides to at least one network element of said cellular communication network at least a flow identifier of said streaming Live-Video communication flow to enable enforcement of said pre-defined traffic handling policy on said streaming Live-Video communication flow.

4. The system of claim 1, wherein said Live-Video/Non-Live-Video detector unit determines that said streaming video communication flow is a streaming Live-Video communication flow and not a streaming Non-Live-Video communication flow, by utilizing a Machine Learning (ML) Engine that applies a pre-defined ML model on values of at least two metadata parameters of said streaming video communication flow to classify said streaming video communication flow as either Live-Video or Non-Live-Video.

5. The system of claim 4, wherein the ML model that is applied by the ML engine is a two-dimensional separator ML model.

6. The system of claim 4, wherein the ML model that is applied by the ML engine is a two-dimensional separator ML model which classifies a communication flow as either Live-Video or Non-Live-Video based at least on: a size in bytes of a Streaming Request that is sent by the UE device to a web portal that conveys to said UE device a particular URL of said destination device.

7. The system of claim 4, wherein the ML model that is applied by the ML engine is a two-dimensional separator ML model which classifies a communication flow as either Live-Video or Non-Live-Video based at least on: a size in bytes of a Generate_204 Request that is sent by the UE device to said destination device.

8. The system of claim 4, wherein the ML model that is applied by the ML engine is a two-dimensional separator ML model which classifies a communication flow as either Live-Video or Non-Live-Video based at least on: (i) an X parameter corresponding to a size in bytes of a Streaming Video Request that is sent by the UE device to a web portal that conveys to said UE device a particular URL of said destination device, and (ii) a Y parameter corresponding to a size in bytes of a Generate_204 Request that is sent by the UE device to said destination device.

9. The system of claim 4, wherein the ML model that is applied by the ML engine is a two-dimensional separator ML model which classifies a communication flow as either Live-Video or Non-Live-Video based on an ML training set that is constructed based on data-points indicating at least: (i) an Operating System of each UE device utilized in the ML training set, and (ii) a browser type of each UE device utilized in the ML training set, and (iii) a type of video consumption application of each UE device utilized in the ML training set, and (iv) packet size in bytes, and (v) packet arrival time.

10. The system of claim 4, wherein the Live-Video/Non-Live-Video detector unit comprises an ML model selector unit, to automatically select a particular ML model that would be applied by said ML engine, based on (i) an identity of a source of said communication source, and also (ii) a type of Operating System which runs on the UE device, and also (iii) a type of application that runs on the UE device and that was utilized for requesting the streaming video from said source.

11. The system of claim 4, wherein the ML model selector unit, to automatically select a particular ML model that would be applied by said ML engine, based on both (I) Deep Packet Inspection (DPI) analysis of said traffic, and (II) analysis of characteristics of one or more video streaming requests that are generated by said UE device.

12. The system of claim 11, wherein said ML model selector unit is configured to select a particular ML model which utilizes at least the following feature: a result of a comparison between (i) a minimum size of the first Streaming Request among multiple streaming video connections that are associated with a single video session, and (ii) a pre-defined threshold value.

13. The system of claim 11, wherein said ML model selector unit is configured to select a particular ML model which utilizes at least the following feature: a result of a comparison between (i) a size in bytes of a Generate_204 Request associated with a single video session, and (ii) a pre-defined threshold value.

14. The system of claim 11, wherein said ML model selector unit is configured to select a particular ML model which utilizes at least the following two features:

(I) a result of a comparison between (i) a size in bytes of a Generate_204 Request associated with a single video session, and (ii) a pre-defined threshold value;

(II) a size of a difference between (a) said size in bytes of the Generate_204 Request, and (b) a minimum size of the first Streaming Request among multiple streaming video connections that are associated with a single video session.

15. The system of claim 11, wherein said ML model selector unit is configured to select a particular ML model which utilizes at least the following feature: a detection whether a video streaming request, that originated from the UE device, is immediately followed by a small packet, wherein a small packet is pre-defined as a packet having less than N bytes, wherein N is a pre-defined threshold value.

16. The system of claim 1, wherein, if said Live-Video/Non-Live-Video detector unit determines that said streaming video communication flow is a streaming Live-Video communication flow and not a streaming Non-Live-Video communication flow, then said streaming video communication flow is assigned a higher transport priority relative to another streaming video communication flow that is determined to be a streaming Non-Live-Video communication flow.

17. The system of claim 1, wherein, if said Live-Video/Non-Live-Video detector unit determines that said streaming video communication flow is a streaming Live-Video communication flow and not a streaming Non-Live-Video communication flow, then said streaming video communication flow is assigned a higher transport priority relative to another streaming video communication flow that is determined to be a non-video communication flow.

18. A computerized method comprising:

(a) deploying a Live-Video/Non-Live-Video detector unit, connected and operable between a core cellular network and an entry node of the Internet;

(b) monitoring data packets exchanged over said core cellular network and over the Internet between a User Equipment (UE) device and a destination device;

(c) determining that a particular communication flow between the UE device and the destination device is a streaming video communication flow;

(d) further determining whether said streaming video communication flow is either (i) a streaming Live-Video communication flow or (ii) a streaming Non-Live-Video communication flow;

(e) triggering deployment of one or more pre-defined operations if it was determined in step (d) that said streaming video communication flow is a streaming Live-Video communication flow and not a streaming Non-Live-Video communication flow;

wherein the method comprises:

selecting and applying a particular Machine Learning (ML) model which utilizes at least the following feature: a feature that (a) defines a window of N consecutive outgoing packets that are outgoing from the UE device and that are associated with a same single streaming video, and (b) performs a check whether at least M outgoing packets, out of said N consecutive outgoing packets, wherein M<N, have individually a byte-size that is greater than a first threshold value V1 and is smaller than a second threshold value V2; and (c) reaches a Live Video determination if the check result is positive, and reaches a Non Live Video determination if the check result is negative;

wherein the threshold values V1 and V2 are pre-defined based on an identity of a source server that was requested by the UE device to stream said single streaming video to said UE device;

wherein the method is implemented by at least a hardware processor.

19. A non-transitory storage medium having stored thereon instructions that, when executed by one or more hardware processors, cause the one or more hardware processors to perform a method comprising:

(a) deploying a Live-Video/Non-Live-Video detector unit, connected and operable between a core cellular network and an entry node of the Internet;

(b) monitoring data packets exchanged over said core cellular network and over the Internet between a User Equipment (UE) device and a destination device;

(c) determining that a particular communication flow between the UE device and the destination device is a streaming video communication flow;

(d) further determining whether said streaming video communication flow is either (i) a streaming Live-Video communication flow or (ii) a streaming Non-Live-Video communication flow;

(e) triggering deployment of one or more pre-defined operations if it was determined in step (d) that said streaming video communication flow is a streaming Live-Video communication flow and not a streaming Non-Live-Video communication flow;

wherein the determining of step (d) comprises:

selecting and applying a particular Machine Learning (ML) model which utilizes at least the following feature: a feature that (a) defines a window of N consecutive outgoing packets that are outgoing from the UE device and that are associated with a same single streaming video, and (b) performs a check whether at least M outgoing packets, out of said N consecutive outgoing packets, wherein M<N, have individually a byte-size that is greater than a first threshold value V1 and is smaller than a second threshold value V2; and (c) reaches a Live Video determination if the check result is positive, and reaches a Non Live Video determination if the check result is negative;

wherein the threshold values V1 and V2 are pre-defined based on an identity of a source server that was requested by the UE device to stream said single streaming video to said UE device.

* * * * *